United States Patent
Travis

(10) Patent No.: US 10,358,256 B2
(45) Date of Patent: Jul. 23, 2019

(54) COLLAPSIBLE UTILITY BUCKET SYSTEM

(71) Applicant: Patricia Ann Travis, Missouri City, TX (US)

(72) Inventor: Patricia Ann Travis, Missouri City, TX (US)

( * ) Notice: Subject to any disclaimer, the term of this patent is extended or adjusted under 35 U.S.C. 154(b) by 0 days.

(21) Appl. No.: 15/849,303

(22) Filed: Dec. 20, 2017

(65) Prior Publication Data

US 2018/0186506 A1   Jul. 5, 2018

Related U.S. Application Data

(60) Provisional application No. 62/440,914, filed on Dec. 30, 2016.

(51) Int. Cl.
| | |
|---|---|
| *B65D 6/08* | (2006.01) |
| *B65D 30/00* | (2006.01) |
| *B65D 21/02* | (2006.01) |
| *B65D 6/16* | (2006.01) |
| *B62B 1/12* | (2006.01) |

(52) U.S. Cl.
CPC .............. *B65D 11/14* (2013.01); *B62B 1/12* (2013.01); *B65D 11/18* (2013.01); *B65D 21/0201* (2013.01); *B65D 29/00* (2013.01); *B62B 2202/22* (2013.01)

(58) Field of Classification Search
CPC .... B65D 11/14; B65D 11/18; B65D 21/0201; B65D 21/02; B65D 21/0204
USPC ...... 220/23.83, 23.4, 23.2, 23.86, 4.26, 4.27, 220/9.4
See application file for complete search history.

(56) References Cited

U.S. PATENT DOCUMENTS

| | | | | |
|---|---|---|---|---|
| 4,235,331 A | * | 11/1980 | Bates, III ............... | A45C 5/045 206/170 |
| 5,048,712 A | * | 9/1991 | Wolters ................. | B65F 1/1415 220/262 |

* cited by examiner

*Primary Examiner* — Steven A. Reynolds
*Assistant Examiner* — Javier A Pagan
(74) *Attorney, Agent, or Firm* — Law Office of Jeff Williams PLLC; J. Oliver Williams

(57) ABSTRACT

A collapsible utility bucket system includes a bucket, a compartment member, a frame hinge, and a sack. The bucket has a frame defining a central volume. The frame includes a base member, a plurality of poles, and a rim. The compartment member is coupled to the bucket and also has a base member, a plurality of poles, and a rim. The frame hinge in is communication with a pole of the bucket and a pole of the compartment member to permit the pivoting of the compartment member about the bucket between set positions. The compartment member pivots so as to rest adjacent to different sides of the bucket at each set position. The sack is configured to couple to a rim of at least one of the bucket and the compartment member and hold assorted items.

13 Claims, 5 Drawing Sheets

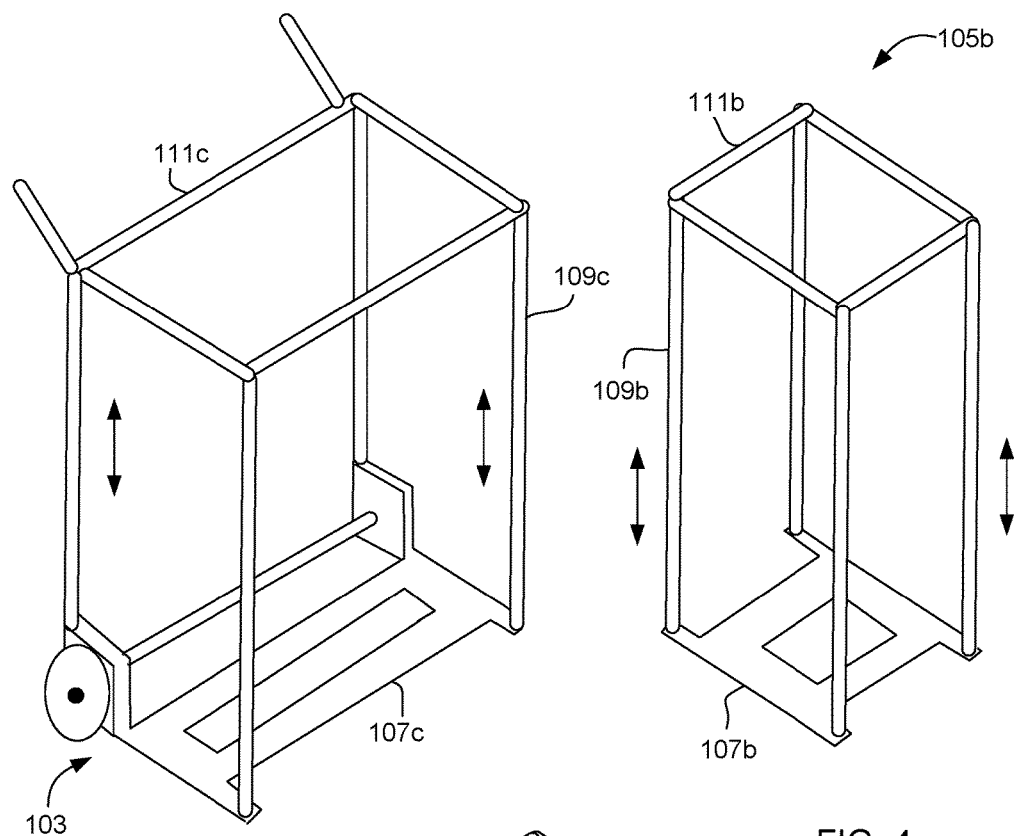
FIG. 2
FIG. 4
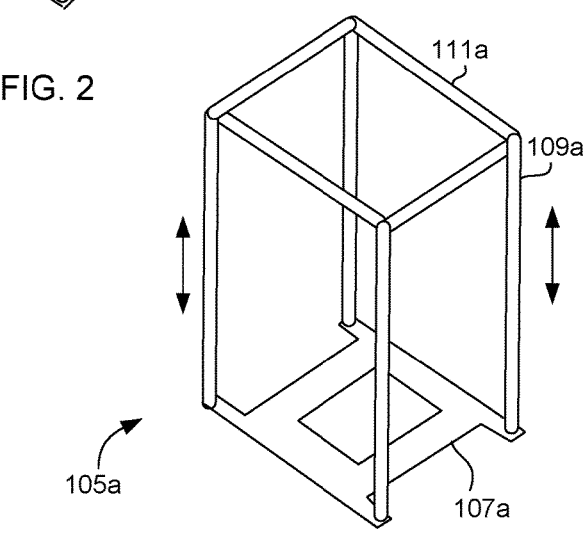
FIG. 3

COLLAPSIBLE UTILITY BUCKET SYSTEM

CLAIM OF PRIORITY

This application claims the benefit of U.S. Provisional Application No. 62/440,914, filed 30 Dec. 2016. The information contained therein is hereby incorporated by reference.

BACKGROUND

1. Field of the Invention

The present application relates generally to storage devices and systems, and in particular to a collapsible utility bucket system for providing improved access and portability.

2. Description of Related Art

Various storage containers are in the market today. Storage containers exist to store miscellaneous items such as toys, tools, decorations, clothes, and other items. Containers can come in various different configurations. Some configurations can be described as a single bucket with a lid. These are often made from a rigid material such as plastic and metallic material. The lids are detachable for access. A disadvantage of these is that they are not so easily transported. They often require a user to pick them up, thereby bearing all the weight of the contents. Additionally, access to the contents requires the removal of the lid.

Other types of containers consist of single compartment carry bags used to place in within a shopping cart or other rolling carriage. These are individual containers that are merely aligned next to other containers. Another example is wired containers used to systematically stack in relation to one another. Both of these types are typically lidless and are not actually part of a single structure.

Although great strides have been made with respect to various containers, considerable shortcomings remain. A new container system is needed that promotes the portability of the contents without having to support its total weight; provides access to the contents via multiple openings at different heights; and complete collapsibility.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 2-4 are perspective views of a bucket and compartment members in the collapsible utility bucket system of FIG. 1.

Figures 1, 5:
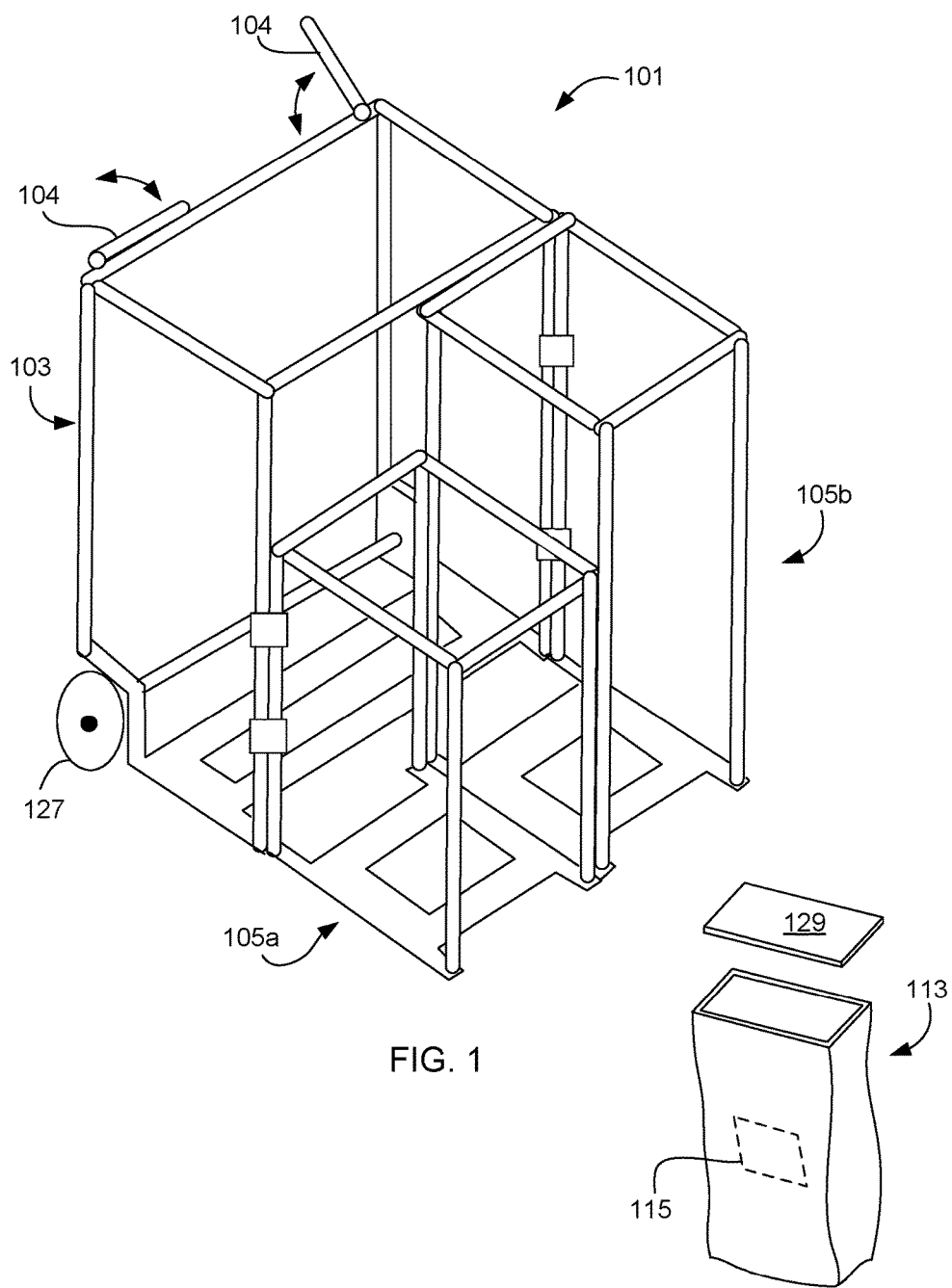
FIG. 1 is a perspective view of a collapsible utility bucket system according to an embodiment of the present application.
FIG. 5 is a perspective view of a bag used in the collapsible utility bucket system of FIG. 1.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method in accordance with the present application overcomes one or more of the above-discussed problems commonly associated with conventional storage containers. Specifically, the collapsible utility bucket system of the present application is configured to simplify the portability of its contents for a user. The system is configured to provide individually collapsible and individual internal compartments. Each compartment is accessible to a user from multiple openings. One such opening is at the top. Another opening is on the side. These are designed to promote the accessibility of the contents to users of different ages and maturity levels. Another feature of the system is that each compartment is removable and/or collapsible with respect to the other compartments. Likewise, some compartments are configured to pivot relative to others. These and other unique features of the device are discussed below and illustrated in the accompanying drawings.

The system and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system and method of the present application includes a singular body structure configured to support and accept the attachment of one or more compartment members. Each compartment member is configured to house a plurality of items from a user. Each is configured to grant access to the user through one or more different locations. Wheels are included to ease transportation. The body structure is configured to fully collapse either individually or collectively. In this state, the system is ideally suited for storage and transportation. Additional features and functions of the device are illustrated and discussed below.

Referring now to the drawings wherein like reference characters identify corresponding or similar elements in form and function throughout the several views. FIG. 1 in the drawings illustrates a collapsible utility bucket system. System 101 is a sturdy indoor/outdoor portable storage device. System 101 includes a central bucket 103 and one or more compartment members 105a-b. Members 105a-b are configured to releasably attach to bucket 103 to permit individual use or collective use as a single unit combined.

The frames of bucket 103 and members 105a-b are illustrated clearly in FIG. 1. The frames of each provide a relatively minimal skeleton defining a central volume for containing items therein. Bucket 103 includes one or more handles 104. Handles 104 may be either rigidly coupled to rim 105c or be collapsible via a hinged connection. AS seen in FIG. 1, one of the handles is collapsed while the other remains extended for visual distinction.

Referring now to FIG. 2-5 in the drawings, the individual frames within system 101 are shown along with an exemplary sack 113. Sack 113 is not shown in bucket 103 or members 105a-b for clarity purposes. Each frame includes a base member 107a-c, poles 109a-c, and an upper rim 111a-c. Within each bucket 103/member 105a-b is a sack 113 as seen in FIG. 5. Poles 109a-c are coupled around a perimeter of base member 107a-c and rim 111a-c respectively. Base member 107a-c is at least partially enclosed but a may include one or more apertures as desired to minimize weight of system 101. Base member 107a-c is configured to improve rigidity of the overall frame and also minimize stresses on the sack 113 of each compartment.

System 101 also includes sack 113. Sack 113 is used to hold items such as toys, supplies, storage items, and so forth. Sack 113 is configured to wrap around and couple to rims 111a-c and have the remaining body of the sack dangle freely. Sack 113 may be attached directly to rim 111 through an attachment member, or sack 113 can be designed to couple to itself with an attachment member wherein it only wraps around rims 111. Exemplary attachment members may be hook and loop fasteners, buttons, snaps, zippers, and so forth. In either configuration, sack 113 is suspended partially from rims 111a-c. Poles 109a-c are configured to help define the space for sack 113 to expand within. As the frames are minimal in nature, room is created to allow the sacks to expand as its contents demand.

Sack 113 is made of a material that is durable and easy to clean. Sack 113 is configured to provide access internally to a user in multiple ways. A user may access internally held contents through the opening by passing through rim 111a-c. In another way, sack 113 may further provide access to a user through a side of the sack. Although this is strictly optional, sack 113 may include an optional passage 115 to permit side access. Passage 115 may be selectively closable wherein a flap or other obstructive material may rest across passage 115 to selectively operate between an open and closed position. This can help to maintain the contents therein without spilling. Passage 115 allows users of various younger ages or sizes full access to the contents. Passage 115 may also include one or more attachment members.

It should be noted that the frames used with bucket 103 and members 105a-b are light weight and generally rigid in nature. An exemplary material may be a Polyvinyl chloride (PVC). Sizes are not limited, nor are configurations limited to that shown or described herein. As also seen in FIG. 1 is that member 105a is different in height to that of member 105b. Members 105 may be configured to be different heights by varying the length of poles 109a-b. In other embodiments, poles 109a-c may be configured to telescope so as to permit selective height adjustments for each bucket/compartment member. It is understood that other parts of system 101 may be adjustable in length, such as handles 104 and rims 111. By having sack 113 be a flexible material and lightweight, it easily adapts to the size and height of each bucket/compartment member. In this manner, the frames are configured to support sack 113 in an elevated and open position while also permitting the selective partial or full collapsing of the entire system to suit the needs of the users. The collapsing or adjusting the length of the frame pieces allows a user to condense the space needed for storage of system 101.

Figure 6:
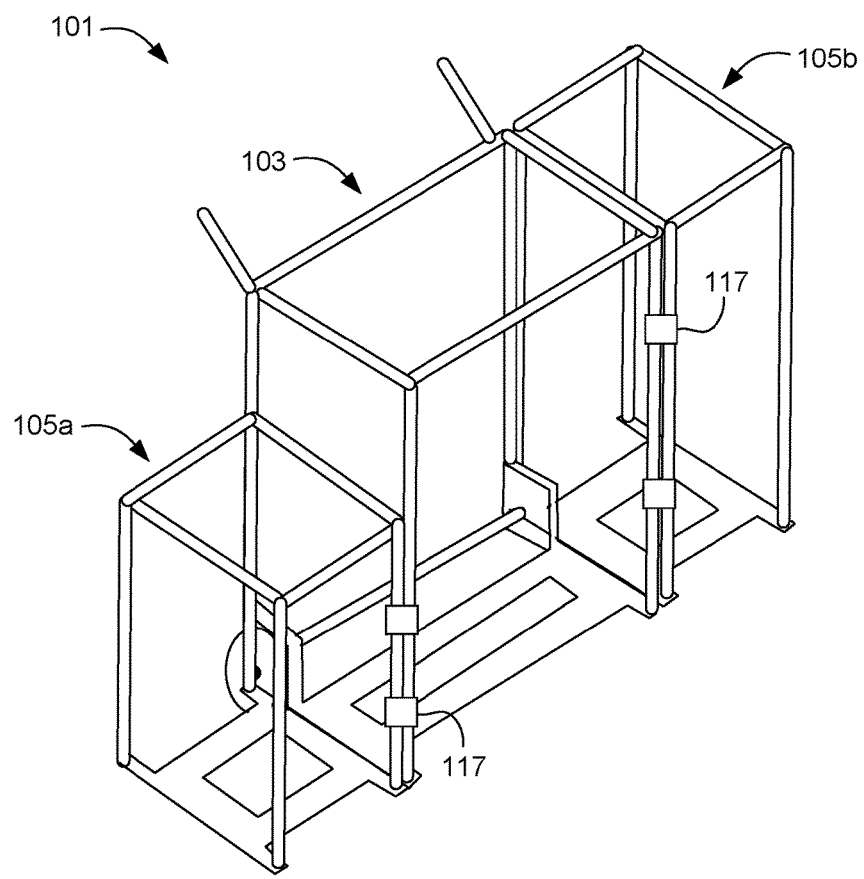
FIG. 6 is a perspective view of the collapsible utility bucket system of FIG. 1 with the compartment members pivoted.

Referring now also to FIG. 6 in the drawings, an alternate orientation of system 101 is provided. As alluded to above, members 105a-b are configured to rotate about their neighboring pole 109c so as to permit them the be either located in front of bucket 103 as seen in FIG. 1 or on either side of bucket 103 as seen in FIG. 6.

Figure 7:
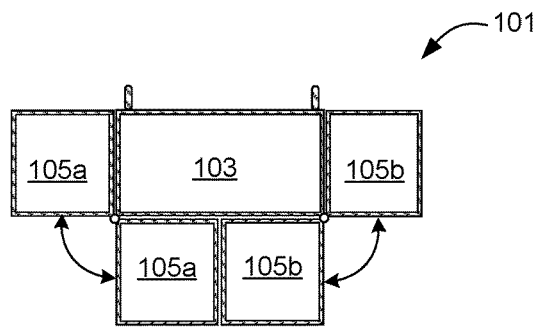
FIGS. 7-9 are top views of the collapsible utility bucket system of FIG. 1 illustrating different set positions.
Figure 8:
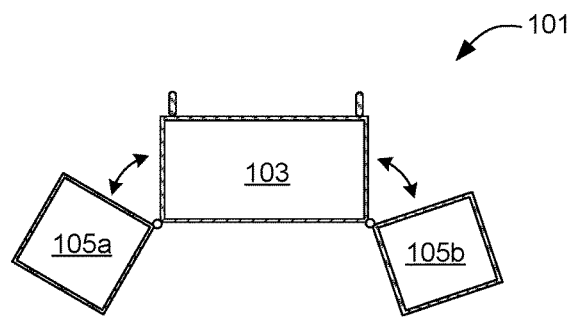
Figure 9:
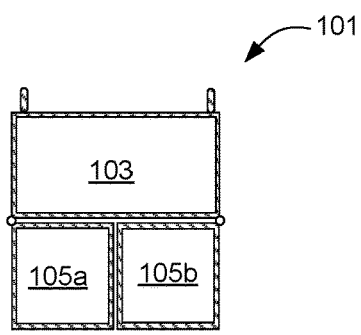

Referring now also to FIGS. 7-9 in the drawings, assorted top views of system 101 are provided for the purpose of illustrating the movement of members 105a-b relative to bucket 103. In FIG. 7, members 105a-b are shown in both set positions, namely in front of bucket 103 and on the side of bucket 103. In FIG. 8, members 105a-b are shown in a transitioning position between the set positions. In FIG. 9, members 105a-c are shown in a front set position similar to that of FIG. 1. In FIG. 6 members 105a-b were shown in the side set position.

Figure 10:
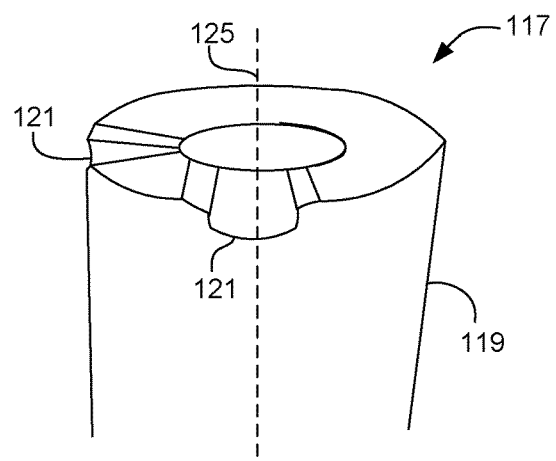
FIGS. 10 and 11 are perspective views of a frame hinge used in the collapsible utility bucket system of FIG. 1.
Figure 11:
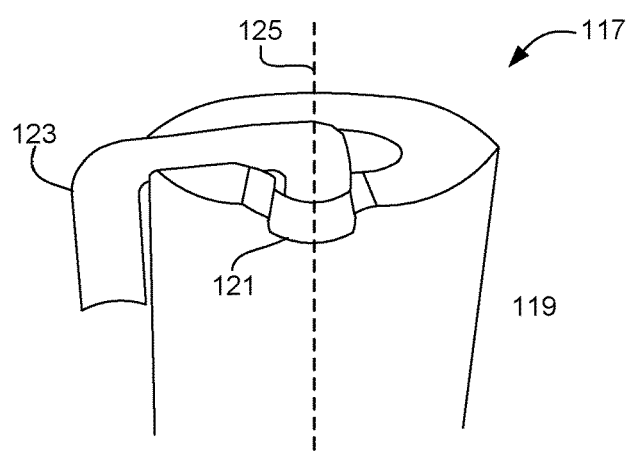

Referring now also to FIGS. 10 and 11 in the drawings, frame hinge 117 is illustrated. Frame hinge 117 is configured to selectively couple poles 109c with the poles 109a-b of members 105a-b. Hinges 117 provide the ability for variable positioning of members 105a-b. Hinges 117 include a body 119 and a plurality of grooves 121 along either a top or bottom surface depending on their positioning on poles 109a-c. Further included is a connector 123 (FIG. 11). Connector 123 passes through body 119 and is coupled to a portion of any of poles 109a-c. Ideally, connector 123 is inserted from the bottom of member 207 but may be inserted from the top depending on configuration.

The idea of operation is that as grooves 121 act to restrict movement or pivoting of members 105a-b. Grooves 121 serve to act as locks or position retention grooves. The weight of each compartment seats member 209 in a particular groove 211 such that the compartment is not able to rotate. Transitioning between the locked positions to a rotatable position, a user may merely lift up on the compartment to move, and freely rotate as needed about central axis 125 to an opposing groove 121. When fully pivoted, connector 123 seats within a different groove 121. Grooves 121 may be located to permit any number of locking locations. It is understood that many types of hinges may be used and the present design is not meant to be the only method of hinging the frames within system 101.

Also seen in FIG. 1 is the use of wheels 127. System 101 includes wheels 109 to make it easy to transport or move bucket 103/members 105*a-b* and its contents. The frames are tipped onto the wheels and a user merely has to apply a force to either push or pull system 101 in a particular direction.

An optional feature is the inclusion of a lid 129 (see FIG. 5). Lid 129 is configured to provide a cover over the contents and rest over rims 111*a-c* and sack 113. It is secured to upper portions of the frames and can be partially or fully opened as needed to access contents inside sack 113. Lid 129 is not limited to that which is depicted herein but may take the form of various shapes. An advantage to being flexible is that lid 129 is adaptable to accommodate different heighted items stored within system 101.

System 101 includes a number of advantages. The system serves to provide users the ability to store a diverse amount and size of items in a single transportable utility storage cart. The system provides customizable control of each half of the frame. The frames are configured to be completely collapsible for storage. Each member includes a plurality of openings that may be selectively covered or opened to permit access to the contents within.

In summary, system 101 is a sturdy storage device for use indoor or outdoors. Many types of products may be stored therein, including personal items or other lightweight items. Examples of such may include, clothing, bedding, and toys. System 101 includes a number of compartments, each separate from the others. These compartments are aligned so as to form a particular shape. Some of the outer compartments may pivot relative to the bucket thereby forming a different overall shape. This function is important because it allows the overall shape to adjust to the demands of the environment. When positioned to be in a relative square shape (FIG. 1), it may be most easily transported around, fitting within door frames and so forth. Contents within each compartment are aligned with the structure and the wheels to make it more stable in transport. When positioned in more of a rectangular configuration (FIG. 6), it may be most easily made to minimize obstruction within a room or hall. This design is useful for maximizing living space in tiny homes/apartments.

A key feature of system 101 is that the compartments are configured to have a frame independent of other compartments. This allows the compartments to be equipped with telescoping sections that permit the user to customize the height needed. As seen in FIG. 1, the side compartments are different heights. Their heights are adjustable by operating the telescoping features of the frame poles.

The handles 104 are operable in that they are collapsible onto the frame. This lessens the chance of the handle marring or damaging walls, doors, and floors. The user merely folds them in toward the frame when not needed. Each frame of each compartment includes a base support structure configured to improve rigidity of the overall frame and also minimize stresses on the fabric of each compartment.

The current application has many advantages over the prior art including at least the following: (1) extendable handles that allow the system to tilt and push easily; (2) handle for tilting and pulling the system forward; (3) the materials it is made with are durable and lightweight; (4) store large and small items; (5) collapsible frames; (6) adapts to space requirements and transportation restrictions with pivoting compartment members; and (7) when not in use it may be collapsed for minimal storage requirements.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A utility bucket system, comprising:
   a bucket having a frame defining a central volume, the frame including a base member, a plurality of poles, and a rim;
   a compartment member coupled to the bucket, the compartment member having a base member, a plurality of poles, and a rim;
   a frame hinge in communication with a pole of the bucket and a pole of the compartment member, the frame hinge configured to permit the pivoting of the compartment member about the bucket between set positions, such that the compartment member pivots so as to rest adjacent different sides of the bucket at each set position with the frame and the compartment member each retaining its shape during and after transitioning between each set position; and
   a sack configured to couple to a rim of at least one of the bucket and the compartment member, the sack configured to hold assorted items.

2. The system of claim 1, further comprising:
   a handle coupled to the rim of the bucket.

3. The system of claim 2, wherein the handle is hinged relative to the rim of the bucket.

4. The system of claim 1, further comprising:
   a lid configured to limit access to an interior of the sack.

5. The system of claim 4, wherein the lid is detachable.

6. The system of claim 4, wherein the lid rests across the sack and a rim in association with the sack.

7. The system of claim 1, wherein the sack includes a passage to permit access to the interior via a side of the sack.

8. The system of claim 7, wherein the passage selectively opens and closes.

9. The system of claim 1, wherein the frame hinge includes a body having one or more grooves that define the set positions of the compartment member relative to the bucket.

10. The system of claim 1, wherein the poles of the bucket are telescoping to permit length adjustment.

11. The system of claim 1, wherein the poles of the compartment member are telescoping to permit length adjustment.

12. The system of claim 1, wherein the bucket and the compartment member are collapsible for storage.

13. A utility bucket system, comprising:
- a bucket having a frame defining a central volume, the frame including a base member, a plurality of poles, and a rim;
- a compartment member coupled to the bucket, the compartment member having a base member, a plurality of poles, and a rim;
- a frame hinge in communication with a pole of the bucket and a pole of the compartment member, the frame hinge configured to permit the pivoting of the compartment member about the bucket between set positions, the frame hinge includes a body having one or more grooves that define the set positions of the compartment member relative to the bucket, the hinge being rotated by lifting it out of the one or more grooves, the compartment member pivots about the frame hinge so as to rest adjacent different sides of the bucket at each set position with the frame and the compartment member each retaining its shape during and after transitioning between each set position; and
- a sack configured to couple to a rim of at least one of the bucket and the compartment member, the sack configured to hold assorted items.

\* \* \* \* \*